United States Patent [19]
Matsumoto et al.

[11] Patent Number: 5,886,088
[45] Date of Patent: *Mar. 23, 1999

[54] POLYETHYLENE TEREPHTHALATE RESIN COMPOSITION

[75] Inventors: Kazuaki Matsumoto, Osaka; Masahiko Mihoichi, Hyogo; Youichi Ohara, Osaka; Kazushi Hirobe, Osaka; Kenji Mogami, Osaka; Tadashi Koyama, Osaka, all of Japan

[73] Assignee: Kanegafuchi Kagaku Kogyo Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 772,215
[22] PCT Filed: Feb. 21, 1996
[86] PCT No.: PCT/JP96/00382
§ 371 Date: Oct. 21, 1996
§ 102(e) Date: Oct. 21, 1996
[87] PCT Pub. No.: WO96/26245
PCT Pub. Date: Aug. 29, 1996

[30] Foreign Application Priority Data

| Feb. 23, 1995 | [JP] | Japan | 7-061826 |
| Feb. 23, 1995 | [JP] | Japan | 7-061827 |
| Feb. 23, 1995 | [JP] | Japan | 7-061828 |
| Feb. 23, 1995 | [JP] | Japan | 7-061829 |
| Feb. 23, 1995 | [JP] | Japan | 7-061830 |
| Feb. 23, 1995 | [JP] | Japan | 7-061831 |

[51] Int. Cl.[6] ........................... C08L 67/02
[52] U.S. Cl. .................. 524/539; 524/605; 525/437; 525/438; 525/444; 528/283
[58] Field of Search ............... 525/437, 438, 525/444; 528/283; 524/605, 539

[56] References Cited

U.S. PATENT DOCUMENTS

| 3,193,522 | 7/1965 | Neumann | 524/195 |
| 3,547,873 | 12/1970 | Weissermel | 525/438 |
| 3,560,605 | 2/1971 | Siggel | 525/438 |
| 3,723,568 | 3/1973 | Hoeschele | 525/438 |
| 3,842,043 | 10/1974 | Chimura | 528/283 |
| 5,210,170 | 5/1993 | Quiring et al. | |
| 5,378,796 | 1/1995 | George | 528/283 |

FOREIGN PATENT DOCUMENTS

| 62-146948 | 6/1987 | Japan . |
| 64-29456 | 1/1989 | Japan . |
| 5-230194 | 9/1993 | Japan . |
| 1431916 | 4/1976 | United Kingdom . |

*Primary Examiner*—Patricia A. Short
*Attorney, Agent, or Firm*—Armstrong, Westerman, Hattori, McLeland & Naughton

[57] ABSTRACT

There are provided a polyethylene terephthalate resin composition in which to 100 parts by weight of a polyethylene terephthalate resin (A) polymerized by use of a germanium catalyst and having at least 80% of an ethylene terephthalate repetition unit, 0.05 to 30 parts by weight of a compound selected from the group consisting of an epoxy compound having at least two intramolecular epoxy groups without any intramolecular ester linkage and a carbodiimide compound (B) is formulated, and resin compositions in which a fibrous reinforcing material (C), a block copolymer (D) and an inorganic nucleating agent (E) are further formulated in the above mentioned composition. The resin composition of the present invention is excellent in moist heat resistance, fluidity and mechanical strength, and in addition, can be subjected to high cycle molding even in a mold of a low temperature to yield a molded article with improved surface characteristics.

6 Claims, No Drawings

POLYETHYLENE TEREPHTHALATE RESIN COMPOSITION

TECHNICAL FIELD

The present invention relates to a polyethylene terephthalate resin composition which has excellent moist heat resistance, fluidity and mechanical strength and further exhibits satisfactory surface characteristics even when molding with a mold of a low temperature, thereby enabling high cycle molding.

BACKGROUND ART

Polyethylene terephthalare resins have been widely used as fibers, films, molding materials and the like due to excellent mechanical and chemical properties. However, the polyethylene terephthalate resins have an intramolecular ester linkage, which would be hydrolyzed when the resins are exposed to a high temperature and high humidity condition for a long period of time, thereby the mechanical properties or moist heat resistance thereof being lowered. For that reason, the polyethylene terephthalate resins are not suitable for a specific field where the moist heat resistance is required, such as for an electric rice-cooker. In order to improve such defect, for example; Japanese Patent Laid-Open No. 46-5,389 describes a method for blending compounds having an intramolecular carbodiimide group to polyethylene terephthalate resins to prevent a decrease in strength thereof. Further, Japanese Patent Publication No. 47-13,860 describes that a polyfunctional compound such as an epoxy compound is added to polyethylene terephthalate to increase molecular weight, thereby improving impact strength thereof.

However, the compound having an intramolecular carbodiimide group, in spite of an expensive price, should be added in a considerably large amount to polyethylene terephthalate to sufficiently exhibit an improvement in the moist heat resistance. On the other hand, although it is possible to improve the moist heat resistance to a certain extent by adding a polyfunctional epoxy compound to polyethylene terephthalate, a resin thus prepared has poor fluidity and is not adaptable to injection molding to form thin-walled products. Further, when a nucleating agent of organic acid metal salts is added to a polyethylene terephthalate resin to accelerate the rate of crystallization for the purpose of improving moldability of the resin, the moist heat resistance becomes so deteriorated that the resin can not be applied to a field where such resistance is required.

As a result of an intensive series of studies by the present inventors to solve the above mentioned problems, it has been found that a resin of improved fluidity, moist heat resistance and mechanical strength can be obtained by adding a compound having not less than two intramolecular epoxy groups and none of intramolecular ester linkage therein, and/or a carbodiimide compound (B), and if necessary, a fibrous reinforcing material (C) to a polyethylene terephthalate resin (A) polymerized with a germanium catalyst.

It has also been found that a crystallization rate of a polyethylene terephthalate resin can be improved without losing the above mentioned properties by adding a predetermined amount of an inorganic nucleating agent (E), thereby enabling high cycle molding.

Further, it has been found that a molded article, which exhibits satisfactory surface characteristics even when molding with a mold of a low temperature, can be obtained by adding a predetermined amount of a specific block copolymer (D), with the above mentioned properties being kept.

The present invention has been accomplished on the basis of these results as described above.

DISCLOSURE OF THE INVENTION

According to a first aspect of the present invention, there is provided a polyethylene terephthalate resin composition in which to 100 parts by weight of a polyethylene terephthalate resin (A) polymerized by use of a germanium catalyst and having at least 80% of an ethylene terephthalate repetition unit, 0.05 to 30 parts by weight of a compound (B) selected from the group consisting of an epoxy compound having at least two intramolecular epoxy groups without any intramolecular ester linkage and a carbodiimide compound is formulated.

According to a second aspect of the present invention, there is provided a polyethylene terephthalate resin composition in which to 100 parts by weight of a polyethylene terephthalate resin (A) polymerized by use of a germanium catalyst and having at least 80% of an ethylene terephthalate repetition unit, 0.05 to 30 parts by weight of a compound (B) selected from the group consisting of an epoxy compound having at least two intramolecular epoxy groups without any intramolecular ester linkage and a carbodiimide compound, and 2 to 150 parts by weight of a fibrous reinforcing material (C) are formulated.

According to a third aspect of the present invention, there is provided a polyethylene terephthalate resin composition in which to 100 parts by weight in total of a mixture (A)+(D) comprising 5 to 99 parts by weight of a polyethylene terephthalate resin (A) prepared by use of a germanium catalyst and having at least 80% of an ethylene terephthalate repetition unit and 95 to 1 parts by weight of a block copolymer (D) comprising 3 to 60% by weight of a polyether compound and 97 to 40% by weight of a polyethylene terephthalate resin and/or an ethylene terephthalate oligomer polymerized by use of a germanium catalyst and having at least 80% of an ethylene terephthalate repetition unit, 0.05 to 30 parts by weight of a compound (B) selected from the group consisting of an epoxy compound having at least two intramolecular epoxy groups without any intramolecular ester linkage and a carbodiimide compound is formulated.

According to a fourth aspect of the present invention, there is provided a polyethylene terephthalate resin in which to 100 parts by weight in total of a mixture (A)+(D) comprising 5 to 99 parts by weight of a polyethylene terephthalate resin (A) polymerized by use of a germanium catalyst and having at least 80% of an ethylene terephthalate repetition unit and 95 to 1 parts by weight of a block copolymer (D) comprising 3 to 60% by weight of a polyether compound and 97 to 40% by weight of a polyethylene terephthalate resin and/or an ethylene terephthalate oligomer polymerized by use of a germanium catalyst and having at least 80% of an ethylene terephthalate repetition unit, 0.05 to 30 parts by weight of a compound (B) selected from the group consisting of an epoxy compound having at least two intramolecular epoxy groups without any intramolecular ester linkage and a carbodiimide compound, and 2 to 150 parts by weight of a fibrous reinforcing material (C) are formulated.

According to a fifth aspect of the present invention, there is provided a polyethylene terephthalate resin composition in which to a resin composition of the first to the fourth aspect of the present invention as mentioned above, 0.01 to 50 parts by weight of an inorganic nucleating agent (E) are further formulated.

BEST MODE FOR CARRYING OUT THE INVENTION

A polyethylene terephthalate resin (A) used in the present invention is polymerized by use of a germanium catalyst upon polymerization thereof.

A germanium compound used as a polymerization catalyst in the present invention includes germanium oxide such as germanium dioxide, germanium alcoxide such as germanium tetraethoxide and germanium tetraisopropoxide, germanium hydroxide and an alkali metal salt thereof, germanium glycolate, germanium chloride, germanium acetate and the like, and may be used alone or in combination of two or more of these compounds. Germanium dioxide is preferable above all.

An amount of the germanium compound to be added to the polyethylene terephthalate is preferably 0.005 to 0.1% by weight, and more preferably 0.01 to 0.05% by weight. Polymerization of the polyethylene terephthalate resin (A) hardly proceeds when the amount of the germanium compound to be added to the polyethylene terephthalate is less than 0.005% by weight, while a considerable amount of the germanium catalyst is left in the resin, which would possibly cause an unfavorable side reaction when the amount exceeds 0.01% by weight. The germanium catalyst may be added at any arbitrary point of time before the polymerization reaction starts.

The polyethylene terephthalate resin used in the present invention contains at least 80% or more, preferably 85% or more and more preferably 90% or more of an ethylene terephthalate repetition unit. Characteristic balance of excellent properties of the polyethylene terephthalate resin is lost when the ethylene terephthalate repetition unit is less than 80%.

An acid component, an alcohol and/or a phenol component, or an esterifying derivative thereof, which is all known may be used as a copolymerization component. The acid component includes a bivalent or higher valent aromatic carboxylic acid having 8 to 22 carbon atoms, a bivalent or higher valent aliphatic carboxylic acid having 4 to 12 carbon atoms and a bivalent or higher valent alicyclic carboxylic acid having 8 to 15 carbon atoms as well as an esterifying derivative thereof. More concretely, other than terephthalic acid, there may be used isophthalic acid, naphthalenedicarboxylic acid, bis (p-carboxyphenyl) methaneanthracenedicarboxylic acid, 4,4'-di phenyldicarboxylic acid, 1,2-bis (phenoxy) ethane-4,4'-dicarboxylic acid, 5-sodium sulfoisophthalic acid, adipic acid, sebacic acid, azelaic acid, dodecadionic acid, maleic acid, trimesic acid, trimellitic acid, pyromellitic acid, 1,3-cyclohexandicarboxylic acid, 1,4-cyclohexanedicarboxylic acid, and an esterifying derivative thereof.

The alcohol and/or phenol component includes a bivalent or higher valent aliphatic alcohol having 3 to 15 carbon atoms, a bivalent or higher valent alicyclic alcohol having 6 to 20 carbon atoms, a bivalent or higher valent aromatic alcohol or phenol having 6 to 20 carbon atoms, and an esterifying derivative thereof. More concretely, there may be used propanediol, butanediol, hexanediol, decanediol, neopentyl glycol, cyclohexane dimethanol, cyclohexanediol, 2,2'-bis (4-hydroxyphenyl) propane, 2,2'-(4-hydroxycyclohexyl) propane, hydroquinone, glycerol, pentaerythritol, and an esterifying derivative thereof. There may also be used an oxyacid such as p-oxybenzoic acid and p-hydroxyethoxybenzoic acid as well as an esterifying derivative thereof, a cyclic ester such as $\epsilon$-caprolacton, and the like.

Further, it is possible to use the copolymerization component in which a polyalkylene glycol unit such as polyethylene glycol, polypropylene glycol, polytetramethylene glycol, etc. is partially copolymerized in a high molecular chain.

The above mentioned acid component, the alcohol component and the phenol component may be used alone or in combination of two or more of these compounds.

Various kinds of known methods of polymerization may be used to prepare the polyethylene terephthalate resin without restriction except the catalyst used herein.

First of all, a polymer of a lower polymerization degree may be formed by a method, for example, for directly estrifying terephthalic acid and ethylene glycol without catalyst or in the presence of a catalyst (tin compounds, titanium compounds and the like are used), or transesterification between dimethyl terephthalate and ethylene glycol in the presence of a catalyst (compounds of magnesium, zinc, cobalt, calcium, manganese and the like are used), which is then subjected to melt- or solid state-condensation polymerization by adding a polymerization catalyst of a germanium compound under a condition of a high temperature and a high vacuum, followed by transesterification and elimination of ethylene glycol to prepare the polyethylene terephthalate resin.

When a polyethylene terephthalate resin polymerized with other catalysts such as a conventional antimony catalyst is used to condensation-polymerize a polymer of a lower polymerization degree, the resin thus formed exhibits unfavorably poor moist heat resistance.

In order to improve a color tone of the polyethylene terephthalate resin, phosphoric acid compounds may be added to the resin during the esterification reaction or after the transesterification reaction. Examples are phosphoric acid, phosphorus acid, hypophosphorous acid, monomethyl phosphate, dimethyl phosphate, trimethyl phosphate, methyl diethyl phosphate, triethyl phosphate, triisopropyl phosphate, tributyl phosphate, triphenyl phosphate, tribenzyl phosphate, tricyclohexyl phosphate, trimethyl phosphite, methyl diethyl phosphite, triethyl phosphite, triisopropyl phosphite, tributyl phosphite, triphenyl phosphite and the like.

In general, while the polyethylene terephthalate resin thus prepared has an inherent viscosity of 0.35 to 1.20 dl/g (measured under a condition: phenol/1,1,2,2-tetrachloroethane=50/50 parts by weight, concentration of 0.5% by weight and temperature of 25° C.; the same applies hereinafter), preferably the inherent viscosity is 0.40 to 0.95 dl/g, and more preferably 0.50 to 0.90 dl/g from a standpoint of balance between surface characteristics and mechanical strength of a molded article thus formed. The mechanical strength tends to decrease when the inherent viscosity is less than 0.35 dl/g, while fluidity tends to decrease when it is more than 1.20 dl/g.

The block copolymer (D) used in the present invention is comprised of a polyether compound and a polyethylene terephthalate resin and/or an ethylene terephthalate oligomer having at least 80% of an ethylene terephthalate repetition unit, and is preferably used for the purpose of improving the polyethylene terephthalate resin (A) so as to form a molded article which enables high cycle molding and exhibits satisfactory surface characteristics even when molding with a mold of a low temperature, and to increase the impact resistance.

A portion of the polyethylene terephthalate resin and/or the ethylene terephthalate oligomer having at least 80% of the ethylene terephthalate repetition unit in the block copolymer (D) is included in the same category of the resin (A). Further, for the same reason described above, there is employed materials polymerized by use of a germanium catalyst in the same manner as in the case of the resin (A).

In order to improve the high cycle moldability of the polyethylene terephthalate resin (A) and the surface characteristics of a molded article thereof when molding with a mold of a low temperature, a portion of the polyether compound of the block copolymer (D) is preferably at least one material selected from the group consisting of a compound whose major unit except an end thereof is represented by the following formula (I):

(I)

wherein $R^1$ is an alkyl group having 2 to 5 carbon atoms, k is an integer of 10 to 60, and k pieces of $R^1$ may be different from each other, and a compound represented by the following formula (II):

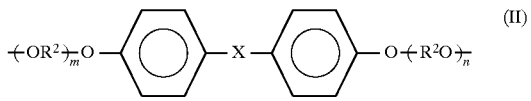

(II)

wherein $R^2$ is an alkyl group having 2 to 5 carbon atoms, X is a bivalent linkage group or a direct linkage, m and n are an integer of 5 to 30, respectively, and m and n pieces of $R^2$ may be different from each other.

The group $R^1$ of the formula (I) typically includes, for example, ethylene, propylene, isopropylene, butylene, bisphenol A residue and the like, which may be used alone or in combination of two or more of these groups. In particular, when more than one polyether compound, which is selected from the polyether compounds having the unit represented by the formula (II), is contained in the block copolymer (D), the surface characteristics of a molded article when the composition thus obtained is molded with a mold of a low temperature, the fluidity during injection molding and the like are preferably improved. The group $R^2$ of the formula (II) typically includes, for example, ethylene, propylene, isopropylene, butylene and the like, which may be used alone or in combination of two or more of these groups. The group X of the formula (II) typically includes, for example, a bivalent group such as —C(CH$_3$)$_2$—, —CH$_2$—, —S—, —SO$_2$—, —CO— and the like, or a direct linkage.

The integer k in the formula (I) is 10 to 60, preferably 12 to 56, and more preferably 14 to 50. Unfavorably, the mechanical strength of the resin decreases when the k is less than 10, while the fluidity decreases at a level over 60.

The integers m and n in the formula (II) are 5 to 30, preferably 6 to 28, and more preferably 7 to 25. Unfavorably, the mechanical strength of the resin decreases when the m and n are less than 5, while the fluidity decreases at a level over 30.

The block copolymer (D) may be prepared by, for example, a method described in Japanese Patent Publication No. 5–8, 941. When a catalyst is added again during the polymerization, the germanium catalyst is preferably used for the reason described above.

While the block copolymer (D) generally has an inherent viscosity of 0.53 to 1.20 dl/g, the inherent viscosity is preferably 0.40 to 1.00 dl/g, and more preferably 0.50 to 0.90 dl/g from a standpoint of balance between the crystallization rate and the mechanical properties.

As to each content of the polyether compound and the polyethylene terephthalate resin and/or the ethylene terephthalate oligomer having at least 80% of the ethylene terephthalate repetition unit in the block copolymer (D) used herein, that of the former compound is 3 to 60% by weight, preferably 25 to 60% by weight and more preferably 25 to 50% by weight, and that of the latter resin and/or the oligomer is 97 to 40% by weight, preferably 75 to 40% by weight and more preferably 75 to 50% by weight to 100% by weight of the block copolymer, respectively. An effect to improve the surface characteristics of a molded article when molding with the mold of a low temperature is not sufficient when the content of the polyether compound is less than 3% by weight, while the mechanical strength, the moist heat resistance and the like of the molded article tend to decrease at the content above 60% by weight.

As to the proportion of the polyethylene terephthalate resin (A) and the block copolymer (D) when the block copolymer is added, (A)/(D) is preferably in the range of 99/1 to 5/95 by weight, more preferably 97/3 to 40/60 by weight and still more preferably 95/5 to 50/50 from a standpoint of balance between the crystallization rate and the mechanical strength.

The epoxy compound used as one component of the compound (B), having at least two epoxy groups in a molecule thereof without any intramolecular ester linkage, exemplarily includes a bisphenol A type epoxy resin prepared by a reaction of bisphenol A and epichlorohydrin; a bisphenol F type epoxy resin similarly prepared as described above; a novolak type epoxy resin prepared by a reaction of a novolak resin, epichlorohydrin and the like; a glycidyl ether compound prepared by a reaction of a polyfunctional aliphatic, alicyclic or aromatic alcohol and epichlorohydrin; an epoxy compound prepared by epoxidizing an aliphatic or an alicyclic compound having plural unsaturated groups with acetic acid and peracetic acid; a glycidyl amine compound prepared by a reaction of a polyfunctional aliphatic, alicyclic or aromatic amine and epichlorohydrin; and an epoxy compound prepared by a reaction of a compound having plural nitrogen containing hetero rings and epichlorohydrin.

An effect to improve the moist heat resistance of the obtained resin is hardly expected when the intramolecular epoxy groups of the epoxy compound is less than 2. Further, when the epoxy compound contains an intramolecular ester linkage, since the moist heat resistance of the epoxy compound per se decreases, not only that of the obtained resin is reduced, but an unfavorable side reaction such as a transesterification reaction with the polyethylene terephthalate resin would be occurred during the molding process.

The above mentioned epoxy compound typically includes, for example, epoxy resins such as EPIKOTE 828, EPIKOTE 1001 and EPIKOTE 152 (registered trademarks; available from Yuka Shell Epoxy Ltd.); epoxy emulsions such as DENACOL EM-125, DENACOL EX-1101, DENACOL EX-1102 and DENACOL EX-1103 (registered trademarks; available from Nagase Chemicals Ltd.); alkylene glycol diglycidyl ethers such as ethylene glycol diglycidyl ether, propylene glycol diglycidyl ether, tetramethylene glycol diglycidyl ether, neopentyl glycol diglycidyl ether and 1,6-hexanediol glycol diglycidyl ether; polyalkylene glycol diglycidyl ether such as polyethylene glycol diglycidyl ether, polybutanediol diglycidyl ether, polypropylene glycol diglycidyl ether, polyneopentyl glycol diglycidyl ether and polytetramethylene glycol diglycidyl ether; resorcinoldiglycidyl ether; erythritol polyglycidyl ether; trimethylolpropane polyglycidyl ether; pentaerythritol polyglycidyl ether; hydroquinone diglycidyl ether; diglycerol polyglycidyl ether; polyglycerol polyglycidyl ether; sorbitan polyglycidyl ether; sorbitol polyglycidyl ether; bisphenol S diglycidyl ether; diglycidyl aniline; tetraglycidyl 4,4'-diaminodiphenylmethane; triglycidyl tris (2-hydroxyethyl) isocyanurate and the like. These epoxy compounds may be used alone or in combination of two or more of the compounds.

An epoxy equivalent of the epoxy compound is preferably 700 or less, more preferably 500 or less and the most preferably 300 or less. The moist heat resistance tends to decrease when the epoxy equivalent exceeds 700.

The carbodiimide compound used in the present invention as the other component of the compound (B) is a compound having at least one carbodiimide group (—N=C=N—) in a molecule thereof and is prepared by heating an organic isocyanate in the presence of a suitable catalyst, followed by a decarbonation reaction. The carbodiimide compound includes, for example, mono- or di-carbodiimide compounds such as diphenylcarbodiimide, dicyclohexylcarbodiimide, di-2,6-dimethylphenylcarbodiimide, diisopropylcarbodiimide, dioctyldecylcarbodiimide, di-o-tolylcarbodiimide, N-tolyl-N'-penylcarbodiimide, N-tolyl-N'-cyclohexylcarbodiimide, di-p-tolylcarbodiimide, di-p-nitrophenylcarbodiimide, di-p-aminophenylcarbodiimide, di-p-hydroxyphenylcarbodiimide, di-p-chlorophenylcarbodiimide, di-o-chlorophenylcarbodiimide, di-3,4-chlorophenylcarbodiimide, di-2,5-chlorophenylcarbodiimide, p-phenylene-bis-o-tolylcarbodiimide, p-phenylene-bis-dicyclohexylcarbodiimide, p-phenylene-bis-di-p-chlorophenylcarbodiimide, hexamethylene-bis-dicyclohexylcarbodiimide, ethylene-bis-dicyclohexylcarbodiimide and the like; polycarbodiimides such as poly (1,6-hexamethylenecarbodiimide), poly (4,4'-methylene-biscyclohexylcarbodiimide), poly (1,3-cyclohexylenecarbodiimide), poly (1,4-cyclohexylenecarbodiimide) and the like; and aromatic polycarbodiimide compounds such as poly (4,4'-diphenylmethanecarbodiimide), poly (3,3-dimethyl-4,4'-diphenylmethanecarbodiimide), poly (naphthylenecarbodiimide), poly (p-phenylenecarbodiimide), poly (m-phenylenecarbodiimide), poly (tolylcarbodiimide), poly (diisopropylcarbodiimide), poly (methyldiisopropylphenylencarbodiimide), poly (triethylphenylenecarbodiimide), poly (triisopropylphenylenecarbodiimide) and the like. STABAXOL I and STABAXOL P are commercially available from Bayer Ltd. The carbodiimide compound having two or more carbodiimide groups in the molecule is particularly preferable because of an excellent improvement in the moist heat resistance.

The carbodiimide compound may be used alone or in combination of two or more of the compounds.

An amount of the epoxy compound having at least two intramolecular epoxy groups without any intramolecular ester linkage and/or the carbodiimide compound to the used as the compound (B) is 0.05 to 30 parts by weight, preferably 0.1 to 20 parts by weight and more preferably 0.4 to 10 parts by weight to 100 parts by weight of the resin (A) or 100 parts by weight in total of the resin (A)+ the copolymer (D) as a mixture. The effect to improve the moist. heat resistance decreases when the amount to be used is less than 0.05 parts by weight, while the mechanical strength of the resin obtained or the surface characteristics of the molded article formed tends to be reduced at a level thereof above 20 parts by weight.

When the carbodiimide compound is used as the component (B), the amount thereof to be used is preferably 0.1 to 20 parts by weight to 100 parts by weight of the resin (A) or 100 parts by weight in total of the mixture (A)+(D) from a standpoint of balance between properties.

As the fibrous reinforcing material (C) used in the present invention, glass fibers, carbon fibers, etc. of about 1 to 20 $\mu$m in diameter and about 0.05 to 50 mm in length are preferable. It is preferable to use chopped strand glass fibers treated by a greige binder from a standpoint of workability. In order to improve adhesion of the resin and the fibrous reinforcing material, preferably there is used the material whose surface is treated with a coupling agent or a binder.

Preferably, the above mentioned coupling agent includes, for example, alkoxysilane compounds such as $\gamma$-aminopropyltriethoxysilane, $\gamma$-glycidoxypropyltriethoxysilane and the like, while the binder includes, for example, an epoxy resin, an urethane resin and the like, although the coupling agent and the binder are not restricted by these examples. They may be used alone or in combination of two or more.

An amount of the fibrous reinforcing material (C) to be added to the present composition is 2 to 150 parts by weight, preferably 5 to 135 parts by weight and more preferably 10 to 120 parts by weight to 100 parts by weight of the resin (A) or 100 parts by weight in total of the mixture (A)+(D). When the amount of the fibrous reinforcing material (C) exceeds 150 parts by weight, the moldability decreases and further degradation or deterioration or the resin is accelerated due to notable heat release upon molding thereof, while the mechanical strength becomes insufficient at a level below 2 parts by weight.

The inorganic nucleating agent (E) used in the present invention includes, for example, inorganic fine powders such as talc, mica, wollastonite, clay, kaolin, diatomaceous earth, bentonite, montmorillonite, hydrotalcite, calcium carbonate, titanium oxide, potassium titanate, asbestos, barium sulfide and the like. The agent may be used alone or in combination of two or more. The nucleating agent which contains silicon dioxide is particularly preferable because of an excellent nucleating effect thereof. The nucleating agent may be added to the composition at any point of time, such as during a polymerization or kneading process.

By the use of a conventional nucleating agent other than the inorganic one, such as a metal salt of organic carboxylic acid, the moist heat resistance and the fluidity of the resin thus obtained decreases considerably.

An amount of the inorganic nucleating agent (E) used in the present invention is 0.01 to 50 parts by weight, preferably 0.01 to 30 parts by weight and more preferably 0.01 to 25 parts by weight to 100 parts by weight of the resin (A) or 100 parts by weight in total of mixture (A)+(D). The mechanical strength tends to decrease or the moist heat resistance would be affected, when the amount of the inorganic nucleating agent to be added exceeds 50 parts by weight, while a sufficient additive effect thereof can not be obtained at a level lower than 0.01 parts by weight.

The composition of the present invention may further be added with any other thermoplastic or thermosetting resin other than the polyethylene terephthalate resin, which includes, for example, saturated or unsaturated polyester resins, liquid crystal polyester resins, polyester elastomeric resins, polyester ether elastomeris resins, polyolefin resins, polyamide resins, polycarbonate resins, rubber-like polymer reinforced styrene resins, polyphenylene sulfide resins, polyphenylene ether resins, polyacetal resins, polysulfone resins, polyarylate resins and the like. They may be added alone or in combination of two or more in such an amount that the present resin is not affected.

Preferably, an antioxidant such as a phenol or thioether antioxidant, etc., and a heat stabilizer such as a phosphorus heat stabilizer are added alone or as a combination of two or more of such additives to the resin of the present invention so as to yield more improved products. If necessary, the following additives may further be added alone or in combination of two or more to the resin of the present invention: a stabilizer, a lubricant, a mold release agent, a plasticizing agent, a fire retardant additive, a fire retardant auxiliary, a UV absorbing agent, a light stabilizer, a pigment, a dye, an antistatic agent, an electrical conductivity imparting agent, a dispersing agent, a compatibilizing agent, an antimicrobial agent, an epoxy group reacting catalyst and the like.

A preparing process of the polyethylene terephthalate resin of the present invention is not limited to a specific method. For example, the above mentioned components (A)–(E) and other additives or resins may be dried and then melt-kneaded by means of a melt-kneader such as a mono- or biaxial extruder to prepare the resin composition.

A molding process of the thermoplastic resin composition prepared by the present invention is not limited to a specific method but may include various molding methods which have been generally applied to thermoplastic resins, such as injection molding, blow molding, extrusion molding, sheet forming, roll molding, press molding, laminate molding, film forming by melt cast molding, spinning and the like.

The present invention will be described in more detail by the following examples which are not intended to restrict the invention. All parts and percent are based on weight unless otherwise noted.

Evaluation of properties were conducted according to the following manners.

An obtained resin composition was dried by means of an air dryer at a temperature of 140° C. for four hours and then molded by a 50 t-injection molding machine under a condition of a cylinder temperature of 270° C., a cooling time of 30 seconds, a molding cycle time of 45 seconds and a mold temperature of 90° to 120° C. to yield a specimen for the measurement of properties. When the resin could not be molded, an expression "difficulty in molding" was used in the following table.

The moist heat resistance was determined by treating the specimen for 30 hours under a condition of 121° C. and 100% RH to evaluate the maximum strength of a tension test according to ASTM D-638 as a retention rate (%) of thus treated specimen compared with the original one before treatment.

As to determination of the fluidity, B flow ($10^{-2}$ cc/sec) was evaluated according to JIS K-7210 under a condition of a preset temperature of 280° C. and a preheating time of 10 minutes.

The mechanical strength was determined by a tension test according to ASTM D-638 using an ASTM #1 dumbbell specimen to evaluate the maximum strength (MPa).

As to determination of the crystallization temperature, a specimen for evaluation was prepared using about 5 mg of extruded pellets, which was heated from 23° C. to 290° C. at a temperature rise rate of 20° C. /min. to melt the specimen completely while keeping a temperature of 290° C. for 5 minutes and then fallen from 290° C. to 23° C. at a temperature fall rate of 20° C./min. by means of a differential scanning calorimeter DSC-220C available from Seiko Instruments Inc. thereby evaluating the crystallization temperature Tcc (°C.) determined while the temperature was fallen.

As to determination of the surface characteristics, a plate-like molded article of 80 mm×40 mm×3 mm having a mirror surface was formed under the same molding condition except that the die temperature was preset at 90° C., gloss and appearance of a predetermined central position on the largest area thereof were evaluated both through visual and tactile sensations by the following marks for evaluation.

○: a glossy and smooth surface;

Δ: an unevenly glossy or slightly roughened surface;

×: a dull or considerably roughened surface.

As to determination of the high cycle moldability, an obtained resin composition was dried at a temperature of 140° C. for four hours and then injection molded into a bar of ¼ inch in thickness, 12 mm in width and 127 mm in length at a cylinder temperature of 300° C. and a mold temperature of 90° C. by means of a 50 t-injection molding machine, thereby measuring the shortest time (second) to yield a satisfied product without any release deformation or depression caused by protruding pins.

EXAMPLE 1

To 100 parts of polyester formed as a polyethylene terephthalate resin by adding with stirring 1.8 times molar amount of ethylene glycol to dimethyl terephthalate, 0.06 part of magnesium acetate and 0.02 part of germanium dioxide as a polymerization catalyst were added. The thus obtained mixture was heated to a temperature of 250° C. under a normal pressure and subjected to a transesterification reaction to yield a lower polymer, which was further heated to 280° C. while reducing the pressure to 4 Pa over an hour and polymerized for two hours to yield a polyethylene terephthalate resin (A1) having an inherent viscosity of 0.60 dl/g.

A bisphenol A type epoxy resin, EPIKOTE 828 (registered trademark: epoxy equivalent of 185) available from Yuka Shell Epoxy Ltd. was used as an epoxy compound (B1).

The above mentioned polyethylene terephthalate (A1) in an amount of 68.0% and the epoxide compound (B1) in an amount of 1.5% were mixed, which were added with 3% of ADEKASTAB AO-60 (registered trademark) available from Asahi Denka Kogyo K.K. as a hindered phenol antioxidant and 0.2% of ADEKASTAB AO-412S (registered trademark) available from Asahi Denka Kogyo K.K. as a thioether stabilizer, stirred by a Super mixer and then fed into a biaxial extruder provided with a vent, TEX44 (registered trademark) available from The Japan Steel Works, Ltd., and preheated to a barrel temperature of 260° C. through a hopper thereof.

Glass fiber T-195H/PS (registered trademark) available from Nippon Electric Glass Co., Ltd. as a fibrous reinforcing material (C1) in an amout of 30.0% was added to the mixture through a side feeder of the extruder to yield a resin composition by melt-extrusion.

EXAMPLES 2 TO 59

In about the same polymerization process as described above (A1), a polyethylene terephthalate resin (A2) having an inherent viscosity of 0.75 dl/g was polymerized by use of a germanium catalyst and used as the polyethylene terephthalate resin.

An ethyleneoxide addition polymer of bisphenol A having an average molecular weight of 1,000 in an amount of 30% and an ethylene terephthalate oligomer, polymerized by use of germanium dioxide as a catalyst, in an amount of 70% were melt-kneaded under a reduced pressure were copolymerized to yield a block copolymer (D1) having an inherent viscosity of 0.70 dl/g and used as the block copolymer.

DENACOL EX-920 (registered trademark: epoxy equivalent of 180) available from Nagase Chemicals Ltd., polypropylene glycol diglycidyl ether (B2) as an epoxy compound, EPIKOTE 180S65 (registered trademark; epoxy equivalent of 210) available from Yuka Shell Epoxy Ltd, an o-cresol novolak type epoxy resin (B3) as another epoxy compound, and STABAXOL P (registered trademark) available from Bayer Ltd., aromatic carbodiimide (B4) as a carbodiimide compound were used, respectively.

MICRO ACE K-1 (registered trademark) (E1), talc available from Nippon Talc Co., Ltd., LMP-100 (registered trademark) (E2), talc available from Fuji Talc Co., Ltd., A-21S (registered trademark) (E3), mica available from Yamaguchi Mica Co., Ltd., NYAD325 (registered trademark) (E4), WOLLASTONITE available from NYCO Co., Ltd., and SATINTONE No. 5 (registered trademark) (E5), kaolin available from Tsuchiya Kaolin Co., Ltd were used as a nucleating agent, respectively.

Except that each component described above was mixed in a ratio shown in Table 1, the resin compositions were obtained in a similar manner as in Example 1.

Comparative Example 1

A polyethylene terephthalate resin [BELLPET PBK-2 (registered trademark: inherent viscosity of 0.65 dl/g), available from Kanebo, co., Ltd.] (A0) polymerized by use of an antimony catalyst, antimony trioxide was used as a polyethylene terephthalate resin.

The resin composition was obtained by employing the same components, except the resin (A0), in the same compounding ratio in the same manner as in Example 1.

Comparative Examples 2 to 49

Glycidyl methacrylate which has an intramolecular epoxy group and an intramolecular ester linkage (a reagent available from Wako Pure Chemical Industries, Ltd.: epoxy equivalent of 142) (B0) and DENACOL EX-711 (registered trademark: epoxy equivalent of 149) (B9) available from Nagase Chemicals Ltd., terephthalic acid diglycidyl ester as an epoxy compound, and p-t-butyl benzoate sodium salt (E0) as a nucleating agent of an organic carboxylic acid metal salt were used, respectively.

The resin compositions were obtained in the same manner as in Example 1 except that each component (A), (D), (B), (C) and (E) was used in a compounding ratio as shown in Table 2, respectively.

As is shown from Examples 1 to 50 shown in Table 1, the compositions according to the present invention are excellent in the fluidity and the moist heat resistance.

In contrast, in Comparative Examples 1 to 18 as shown in Table 2, the resin compositions of Comparative Examples 1 to 9 exhibit poor fluidity and moist heat resistance, and those of Comparative Examples 10 to 18 show poor moist heat resistance because the polyethylene terephthalate resin is polymerized by use of the antimony catalyst.

Poor moist heat resistance is observed in Comparative Examples 19 to 21 because of the absence of a polyfunctional compound. In Comparative Examples 22 to 27, the moist heat resistanse is poor in Comparative Examples 22 to 24, while difficulty in molding is observed in the Comparative Examples 25 to 27, since polyfunctional compounds other than those used in the present invention are used.

The difficulty in molding or a significant decrease in the mechanical strength is observed in Comparative Examples 28 to 33 because of an excessive addition of the polyfunctional compound.

The difficulty in molding is observed in each case of Comparative Examples 34 to 39 and 40 to 43 because of an excessive addition of the fibrous reinforcing material and the inorganic nucleating agent, respectively.

The moist heat resistance is remarkably decreased in Comparative Examples 44 to 47 because the nucleating agent other than those used in the peresent invention is employed, while the fluidity, in addition, is reduced in Comparative Examples 44 to 45.

The moist heat resistance, the mechanical strength, the surface characteristics of the molded article and the moldability are reduced in Comparative Examples 48 to 49 because of an excessive addition of the block copolymer.

TABLE 1

| | Proportions (%) | | | | | | Examples Properties | | | | | |
|---|---|---|---|---|---|---|---|---|---|---|---|---|
| (A) | (D) | (B) | (C) | (E) | AO-6O | AO 41 2S | Moist heat resistance | Fluidity | Mechanical strength | Crystallizing temperature | Surface characteristics | Moldability |
| 1 (A1)68 | — | (B1)1.5 | (C1)30 | — | .3 | .2 | 72.4 | 12.0 | 170 | | | |
| 2 (A1)69 | — | (B1)0.5 | (C1)30 | — | .3 | .2 | 68.7 | 12.3 | 166 | | | |
| 3 (A1)67 | — | (B1)2.5 | (C1)30 | — | .3 | .2 | 80.1 | 11.6 | 173 | | | |
| 4 (A1)83 | — | (B1)1.5 | (C1)15 | — | .3 | .2 | 69.0 | 13.2 | 151 | | | |
| 5 (A1)45 | — | (B2)4.5 | (C1)50 | — | .3 | .2 | 78.6 | 9.0 | 172 | | | |
| 6 (A1)69 | — | (B3)0.5 | (C1)30 | — | .3 | .2 | 78.8 | 9.1 | 170 | | | |
| 7 (A2)68 | — | (B1)1.5 | (C1)30 | — | .3 | .2 | 75.2 | 10.0 | 171 | 201 | | |
| 8 (A1)69 | — | (B4)0.5 | (C1)30 | — | .3 | .2 | 66.5 | 27.1 | 166 | | | |
| 9 (A1)68 | — | (B4)1.5 | (C1)30 | — | .3 | .2 | 71.9 | 27.5 | 167 | | | |
| 10 (A1)67 | — | (B4)2.5 | (C1)30 | — | .3 | .2 | 79.8 | 28.9 | 169 | | | |
| 11 (A1)83 | — | (B4)1.5 | (C1)15 | — | .3 | .2 | 67.7 | 32.2 | 153 | | | |

TABLE 1-continued

Examples

| | Proportions (%) | | | | | AO-60 | AO412S | Moist heat resistance | Fluidity | Mechanical strength | Crystallizing temperature | Surface characteristics | Moldability |
|---|---|---|---|---|---|---|---|---|---|---|---|---|---|
| | (A) | (D) | (B) | (C) | (E) | | | | | | | | |
| 12 | (A1)45 | — | (B4)4.5 | (C1)50 | — | .3 | .2 | 75.9 | 19.6 | 149 | | | |
| 13 | (A2)68 | — | (B4)1.5 | (C1)30 | — | .3 | .2 | 73.6 | 24.3 | 168 | 200 | | |
| 14 | (A1)63 | — | (B1)1.5 | (C1)30 | (E1)5 | .3 | .2 | 69.8 | 10.9 | 170 | 210 | X | 30 |
| 15 | (A1)64 | — | (B1)0.5 | (C1)30 | (E1)5 | .3 | .2 | 65.0 | 11.2 | 170 | 211 | | |
| 16 | (A1)62 | — | (B1)2.5 | (C1)30 | (E1)5 | .3 | .2 | 80.1 | 10.3 | 166 | 206 | | |
| 17 | (A1)78 | — | (B1)1.5 | (C1)15 | (E1)5 | .3 | .2 | 68.2 | 12.8 | 150 | 205 | | |
| 18 | (A1)43 | — | (B1)1.5 | (C1)50 | (E1)5 | .3 | .2 | 74.1 | 8.4 | 175 | 210 | | |
| 19 | (A1)67 | — | (B1)1.5 | (C1)30 | (E1)1 | .3 | .2 | 74.9 | 12.6 | 170 | 208 | | |
| 20 | (A1)58 | — | (B1)1.5 | (C1)30 | (E1)10 | .3 | .2 | 65.8 | 9.9 | 170 | 212 | | |
| 21 | (A1)45 | — | (B2)4.5 | (C1)40 | (E1)10 | .3 | .2 | 77.0 | 8.9 | 170 | 206 | | |
| 22 | (A1)64 | — | (B3)0.5 | (C1)30 | (E1)5 | .3 | .2 | 77.9 | 9.0 | 170 | 209 | | |
| 23 | (A1)63 | — | (B1)1.5 | (C1)30 | (E2)5 | .3 | .2 | 69.5 | 11.0 | 168 | 210 | | |
| 24 | (A1)63 | — | (B1)1.5 | (C1)30 | (E3)5 | .3 | .2 | 67.7 | 10.7 | 167 | 208 | | |
| 25 | (A1)63 | — | (B1)1.5 | (C1)30 | (E4)5 | .3 | .2 | 63.0 | 11.2 | 168 | 205 | | |
| 26 | (A1)63 | — | (B1)1.5 | (C1)30 | (E5)5 | .3 | .2 | 71.9 | 10.5 | 148 | 209 | | |
| 27 | (A2)63 | — | (B1)1.5 | (C1)30 | (E1)5 | .3 | .2 | 70.4 | 8.6 | 168 | 206 | | |
| 28 | (A1)64 | — | (B4)0.5 | (C1)30 | (E1)5 | .3 | .2 | 64.4 | 25.7 | 167 | 211 | | |
| 29 | (A1)63 | — | (B4)1.5 | (C1)30 | (E1)5 | .3 | .2 | 70.2 | 26.9 | 166 | 210 | X | 28 |
| 30 | (A1)62 | — | (B4)2.5 | (C1)30 | (E1)5 | .3 | .2 | 77.7 | 27.3 | 164 | 210 | | |
| 31 | (A1)78 | — | (B4)1.5 | (C1)15 | (E1)5 | .3 | .2 | 65.5 | 30.4 | 149 | 206 | | |
| 32 | (A1)41 | — | (B4)3.5 | (C1)50 | (E1)5 | .3 | .2 | 79.8 | 23.3 | 158 | 210 | | |
| 33 | (A1)67 | — | (B4)1.5 | (C1)30 | (E1)1 | .3 | .2 | 75.4 | 27.1 | 168 | 207 | | |
| 34 | (A1)58 | — | (B4)1.5 | (C1)30 | (E1)10 | .3 | .2 | 65.9 | 24.9 | 158 | 212 | | |
| 35 | (A1)63 | — | (B4)1.5 | (C1)30 | (E2)5 | .3 | .2 | 68.8 | 26.2 | 166 | 210 | | |
| 36 | (A1)63 | — | (B4)1.5 | (C1)30 | (E3)5 | .3 | .2 | 65.9 | 25.9 | 167 | 208 | | |
| 37 | (A1)63 | — | (B4)1.5 | (C1)30 | (E4)5 | .3 | .2 | 62.8 | 28.8 | 164 | 206 | | |
| 38 | (A1)63 | — | (B4)1.5 | (C1)30 | (E5)5 | .3 | .2 | 74.0 | 26.3 | 148 | 210 | | |
| 39 | (A2)63 | — | (B4)1.5 | (C1)30 | (E1)5 | .3 | .2 | 74.2 | 22.2 | 169 | 206 | | |
| 40 | (A1)63 | (D1)5 | (B1)1.5 | (C1)30 | — | .3 | .2 | 72.7 | 12.2 | | | ◯ | 18 |
| 41 | (A1)63 | (D1)5 | (B4)1.5 | (C1)30 | — | .3 | .2 | 71.2 | 26.1 | | | ◯ | 18 |
| 42 | (A1)59 | (D1)5 | (B1)0.5 | (C1)30 | (E1)5 | .3 | .2 | 65.9 | 11.4 | | | ◯ | 12 |
| 43 | (A2)58 | (D1)5 | (B1)1.5 | (C1)30 | (E1)5 | .3 | .2 | 70.3 | 11.0 | | | ◯ | 14 |
| 44 | (A1)57 | (D1)5 | (B1)2.5 | (C1)30 | (E1)5 | .3 | .2 | 80.1 | 10.4 | | | ◯ | 16 |
| 45 | (A1)40 | (D1)5 | (B2)4.5 | (C1)40 | (E1)10 | .3 | .2 | 77.7 | 9.1 | | | ◯ | 16 |
| 46 | (A1)59 | (D1)5 | (B3)0.5 | (C1)30 | (E1)5 | .3 | .2 | 78.5 | 9.6 | | | ◯ | 14 |
| 47 | (A1)58 | (D1)5 | (B1)1.5 | (C1)30 | (E5)5 | .3 | .2 | 72.2 | 10.5 | | | ◯ | 14 |
| 48 | (A2)58 | (D1)5 | (B1)1.5 | (C1)30 | (E1)5 | .3 | .2 | 72.4 | 9.4 | | | ◯ | 16 |
| 49 | (A1)73 | (D1)5 | (B1)1.5 | (C1)15 | (E1)5 | .3 | .2 | 67.8 | 13.0 | | | ◯ | 18 |
| 50 | (A1)38 | (D1)5 | (B1)1.5 | (C1)50 | (E1)5 | .3 | .2 | 78.9 | 9.3 | | | ◯ | 14 |
| 51 | (A1)59 | (D1)5 | (B4)0.5 | (C1)30 | (E1)5 | .3 | .2 | 67.7 | 24.8 | | | ◯ | 12 |
| 52 | (A1)58 | (D1)5 | (B4)1.5 | (C1)30 | (E1)5 | .3 | .2 | 70.9 | 27.0 | | | ◯ | 12 |
| 53 | (A1)57 | (D1)5 | (B4)2.5 | (C1)30 | (E1)5 | .3 | .2 | 76.4 | 27.4 | | | ◯ | 16 |
| 54 | (A1)58 | (D1)5 | (B4)1.5 | (C1)30 | (E5)5 | .3 | .2 | 73.4 | 24.3 | | | ◯ | 14 |
| 55 | (A2)58 | (D1)5 | (B4)1.5 | (C1)30 | (E1)5 | .3 | .2 | 74.0 | 21.4 | | | ◯ | 16 |
| 56 | (A1)73 | (D1)5 | (B4)1.5 | (C1)15 | (E1)5 | .3 | .2 | 69.2 | 28.7 | | | ◯ | 16 |
| 57 | (A1)36 | (D1)5 | (B4)3.5 | (C1)50 | (E1)5 | .3 | .2 | 76.5 | 24.1 | | | ◯ | 14 |
| 58 | (A1)87 | (D1)5 | (B1)2.5 | — | (E1)5 | .3 | .2 | 70.0 | 57.2 | | | ◯ | 22 |
| 59 | (A1)87 | (D1)5 | (B4)2.5 | — | (E1)5 | .3 | .2 | 68.3 | 66.8 | | | ◯ | 22 |

TABLE 2

Comparative Examples

| | Proportions (%) | | | | | AO-60 | AO412S | Moist heat resistance | Fluidity | Mechanical strength | Crystallizing temperature | Surface characteristics | Moldability |
|---|---|---|---|---|---|---|---|---|---|---|---|---|---|
| | (A) | (D) | (B) | (C) | (E) | | | | | | | | |
| 1 | (A0)68 | — | (B1)1.5 | (C1)30 | — | .3 | .2 | 47.5 | 7.4 | 169 | | X | |
| 2 | (A0)69 | — | (B1)0.5 | (C1)30 | — | .3 | .2 | 41.9 | 8.2 | 166 | | X | |
| 3 | (A0)67 | — | (B1)2.5 | (C1)30 | — | .3 | .2 | 58.2 | 5.7 | 172 | | X | |
| 4 | (A0)63 | — | (B1)1.5 | (C1)30 | (E1)5 | .3 | .2 | 42.9 | 6.3 | 168 | 202 | X | |
| 5 | (A0)64 | — | (B1)0.5 | (C1)30 | (E1)5 | .3 | .2 | 39.8 | 6.6 | 167 | 204 | X | |
| 6 | (A0)62 | — | (B1)2.5 | (C1)30 | (E1)5 | .3 | .2 | 55.5 | 5.2 | 171 | 200 | X | |
| 7 | (A0)59 | (D1)5 | (B1)0.5 | (C1)30 | (E1)5 | .3 | .2 | 42.2 | 6.7 | 167 | | ◯ | 16 |
| 8 | (A0)58 | (D1)5 | (B1)1.5 | (C1)30 | (E1)5 | .3 | .2 | 47.9 | 6.5 | 167 | | ◯ | 18 |
| 9 | (A0)57 | (D1)5 | (B1)2.5 | (C1)30 | (E1)5 | .3 | .2 | 66.1 | 5.8 | 168 | | ◯ | 20 |

TABLE 2-continued

Comparative Examples

| | Proportions (%) | | | | | | Properties | | | | |
|---|---|---|---|---|---|---|---|---|---|---|---|
| (A) | (D) | (B) | (C) | (E) | AO-6O | AO412S | Moist heat resistance | Fluidity | Mechanical strength | Crystallizing temperature | Surface characteristics | Moldability |
| 10 (A0)69 | — | (B4)0.5 | (C1)30 | — | .3 | .2 | 39.8 | 34.6 | 167 | | X | |
| 11 (A0)68 | — | (B4)1.5 | (C1)30 | — | .3 | .2 | 46.0 | 37.5 | 168 | | X | |
| 12 (A0)67 | — | (B4)2.5 | (C1)30 | — | .3 | .2 | 52.7 | 38.1 | 167 | | X | |
| 13 (A0)64 | — | (B4)0.5 | (C1)30 | (E1)5 | .3 | .2 | 38.9 | 32.1 | 166 | 212 | X | |
| 14 (A0)63 | — | (B4)1.5 | (C1)30 | (E1)5 | .3 | .2 | 43.5 | 35.9 | 166 | 211 | X | |
| 15 (A0)62 | — | (B4)2.5 | (C1)30 | (E1)5 | .3 | .2 | 46.8 | 36.4 | 164 | 210 | X | |
| 16 (A0)59 | (D1)5 | (B4)0.5 | (C1)30 | (E1)5 | .3 | .2 | 40.3 | 30.4 | 167 | | ○ | 16 |
| 17 (A0)58 | (D1)5 | (B4)1.5 | (C1)30 | (E1)5 | .3 | .2 | 41.2 | 33.2 | 166 | | ○ | 18 |
| 18 (A0)57 | (D1)5 | (B4)2.5 | (C1)30 | (E1)5 | .3 | .2 | 45.0 | 35.1 | 167 | | ○ | 20 |
| 19 (A1)69 | — | — | (C1)30 | — | .6 | .4 | 32.5 | 29.0 | 165 | | X | |
| 20 (A1)64 | — | — | (C1)30 | (E1)5 | .6 | .4 | 36.8 | 25.6 | 160 | 212 | X | |
| 21 (A1)59 | (D1)5 | — | (C1)30 | (E1)5 | .6 | .4 | 36.8 | 27.8 | 160 | | ○ | 12 |
| 22 (A1)68 | — | (B0)1.5 | (C1)30 | — | .3 | .2 | 39.7 | 20.3 | 166 | | X | |
| 23 (A1)63 | — | (B0)1.5 | (C1)30 | (E1)5 | .3 | .2 | 39.0 | 19.8 | 164 | 207 | X | |
| 24 (A1)58 | (D1)5 | (B0)1.5 | (C1)30 | (E1)5 | .3 | .2 | 39.8 | 20.0 | 163 | | ○ | 18 |
| 25 (A1)68 | — | (B9)1.5 | (C1)30 | — | .3 | .2 | | | Difficulty in molidng | | | |
| 26 (A1)63 | — | (B9)1.5 | (C1)30 | (E1)5 | .3 | .2 | | | Difficulty in molidng | | | |
| 27 (A1)58 | (D1)5 | (B9)1.5 | (C1)30 | (E1)5 | .3 | .2 | | | Difficulty in molidng | | | |
| 28 (A1)49 | — | (B1)20 | (C1)30 | — | .6 | .4 | | | Difficulty in molidng | | | |
| 29 (A1)49 | — | (B1)15 | (C1)30 | (E1)5 | .6 | .4 | | | Difficulty in molidng | | | |
| 30 (A1)44 | (D1)5 | (B1)15 | (C1)30 | (E1)5 | .6 | .4 | | | Difficulty in molidng | | | |
| 31 (A1)49 | — | (B4)20 | (C1)30 | — | .6 | .4 | | | Difficulty in molidng | | | |
| 32 (A1)49 | — | (B4)15 | (C1)30 | (E1)5 | .6 | .4 | 80.5 | 59.8 | 67 | 204 | X | |
| 33 (A1)44 | (D1)5 | (B4)15 | (C1)30 | (E1)5 | .6 | .4 | 78.5 | 56.0 | 64 | | X | 18 |
| 34 (A1)38 | — | (B1)1.5 | (C1)60 | — | .3 | .2 | | | Difficulty in molidng | | | |
| 35 (A1)35 | — | (B1)1.5 | (C1)58 | (E1)5 | .3 | .2 | | | Difficulty in molidng | | | |
| 36 (A1)30 | (D1)5 | (B1)1.5 | (C1)58 | (E1)5 | .3 | .2 | | | Difficulty in molidng | | | |
| 37 (A1)38 | — | (B4)1.5 | (C1)60 | — | .3 | .2 | | | Difficulty in molidng | | | |
| 38 (A1)35 | — | (B4)1.5 | (C1)58 | (E1)5 | .3 | .2 | | | Difficulty in molidng | | | |
| 39 (A1)30 | (D1)5 | (B4)1.5 | (C1)58 | (E1)5 | .3 | .2 | | | Difficulty in molidng | | | |
| 40 (A1)38 | — | (B1)1.5 | (C1)30 | (E1)25 | .3 | .2 | | | Difficulty in molidng | | | |
| 41 (A1)33 | (D1)5 | (B1)1.5 | (C1)30 | (E1)25 | .3 | .2 | | | Difficulty in molidng | | | |
| 42 (A1)38 | — | (B4)1.5 | (C1)30 | (E1)25 | .3 | .2 | | | Difficulty in molidng | | | |
| 43 (A1)33 | (D1)5 | (B4)1.5 | (C1)30 | (E1)25 | .3 | .2 | | | Difficulty in molidng | | | |
| 44 (A1)67.7 | — | (B1)1.5 | (C1)30 | (E0)0.3 | .3 | .2 | 44.1 | 1.9 | 159 | 194 | Δ | |
| 45 (A1)62.7 | (D1)5 | (B1)1.5 | (C1)30 | (E0)0.3 | .3 | .2 | 43.1 | 1.4 | 158 | | Δ | 36 |
| 46 (A1)67.7 | — | (B4)1.5 | (C1)30 | (E0)0.3 | .3 | .2 | 40.8 | 20.8 | 158 | 194 | Δ | |
| 47 (A1)62.7 | (D1)5 | (B4)1.5 | (C1)30 | (E0)0.3 | .3 | .2 | 40.9 | 19.7 | 156 | | Δ | 38 |
| 48 (A1) 3 | (D1)83 | (B1)1.5 | (C1)15 | — | .3 | .2 | 58.9 | 60.3 | 105 | | X | 42 |
| 49 (A1) 3 | (D1)83 | (B4)1.5 | (C1)15 | — | .3 | .2 | 54.6 | 67.5 | 100 | | X | 40 |

INDUSTRIAL APPLICABILITY

The polyethylene terephthalate resin composition of the present invention is excellent in moist heat resistance, fluidity, and mechanical strength. The crystallization rate is improved by adding an inorganic nucleating agent, thereby enabling high cycle molding. Further, an addition of a block copolymer makes it possible to yield a molded article with improved surface characteristics even in a mold of a low temperature. All of these properties allow the resin to withstand a high temperature and high humidity condition for a long time. Accordingly, the resin composition of the present invention is used for various purposes compared with conventional polyethylene terephthalate compositions, and is very useful as an industrial material.

What is claimed is:

1. A polyethylene terephthalate resin composition comprising
   100 parts by weight of a polyethylene terephthalate resin (A) polymerized by use of a germanium catalyst and having at least 80% of an ethylene terephthalate repetition unit, and
   0.05 to 20 parts by weight of a compound (B) selected from the group consisting of an epoxy compound having at least two epoxy groups and no ester linkage within the molecule and epoxy equivalent of not more than 700 and a polyfunctional carbodiimide compound having at least two intramolecular carbodiimide groups.

2. A polyethylene terephthalate resin composition comprising
   100 parts by weight of a polyethylene terephthalate resin (A) polymerized by use of a germanium catalyst and having at least 80% of an ethylene terephthalate repetition unit,
   0.05 to 20 parts by weight of a compound (B) selected from the group consisting of an epoxy compound having at least two epoxy groups and no ester linkage within the molecule and epoxy equivalent of not more than 700 and a polyfunctional carbodiimide compound having at least two intramolecular carbodiimide groups, and
   2 to 150 parts by weight of a fibrous reinforcing material (C).

3. A polyethylene terephthalate resin composition comprising
   100 parts by weight in total of a mixture (A)+(D) comprising 5 to 99 parts by weight of a polyethylene terephthalate resin (A) prepared by a use of a germanium catalyst and having at least 80% of an ethylene terephthalate repetition unit and 95 to 1 parts by weight of a block copolymer (D) comprising 3 to 60% by weight of a polyether compound and 97 to 40% by weight of a polyethylene terephthalate resin and/or an ethylene terephthalate oligomer polymerized by use of a germanium catalyst and having at least 80% of an ethylene terephthalate repetition unit, and

- 0.05 to 20 parts by weight of a compound (B) selected from the group consisting of an epoxy compound having at least two epoxy groups and no ester linkage within the molecular and epoxy equivalent of not more than 700 and a polyfunctional carbodiimide compound having at least two intramolecular carbodiimide groups.

4. A polyethylene terephthalate resin composition comprising

- 100 parts by weight in total of a mixture (A)+(D) comprising 5 to 99 parts by weight of a polyethylene terephthalate resin (A) prepared by use of a germanium catalyst and having at least 80% of an ethylene terephthalate repetition unit and 95 to 1 parts by weight of a block copolymer (D) comprising 3 to 60% by weight of a polyether compound and 97 to 40% by weight of a polyethylene terephthalate resin and/or an ethylene terephthalate oligomer polymerized by use of a germanium catalyst and having at least 80% of an ethylene terephthalate repetition unit, and
- 0.05 to 20 parts by weight of a compound (B) selected from the group consisting of an epoxy compound having at least two epoxy groups and no ester linkage within the molecular and epoxy equivalent of not more than 700 and a polyfunctional carbodiimide compound having at least two intramolecular carbodiimide groups, and
- 2 to 150 parts by weight of a fibrous reinforcing material (C).

5. A polyethylene terephthalate resin composition of any one of claims 1 to 4, wherein 0.01 to 50 parts by weight of an inorganic nucleating agent (E) is further blended.

6. A polyethylene terephthalate resin composition of any one of claims 3 or 4, wherein the block copolymar comprises 25 to 50% by weight of a polyether compound and 75 to 50% by weight of a polyethylene terephthalate resin and/or an ethylene terephthalare oligomer having an ethylene terephthalate repetition unit as a major ingredient and a major unit of the polyether compound except an end thereof is at least one material selected from the group consisting of a compound represented by the following formula (I):

wherein $R^1$ is an alkyl group having 2 to 5 carbon atoms, k is an integer of 10 to 60, and k pieces of $R^1$ may be different each other, and a compound represented by the following formula (II):

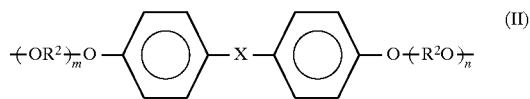

wherein $R^2$ is an alkyl group having 2 to 5 carbon atoms, X is a bivalent linkage group or a direct linkage, m and n are an integer of 5 to 30, respectively, and m and n pieces of $R^2$ may be different each other.

* * * * *